Dec. 22, 1925.                                      1,566,948
R. A. WYATT
TANK GAUGE
Filed April 13, 1925

Inventor
R. A. Wyatt
By C. A. Snow & Co.
Attorneys

Patented Dec. 22, 1925.

1,566,948

UNITED STATES PATENT OFFICE.

ROBERT A. WYATT, OF PARKERSBURG, WEST VIRGINIA.

TANK GAUGE.

Application filed April 13, 1925. Serial No. 22,794.

*To all whom it may concern:*

Be it known that I, ROBERT A. WYATT, a citizen of the United States, residing at Parkersburg, in the county of Wood and State of West Virginia, have invented a new and useful Tank Gauge, of which the following is a specification.

This invention relates to a gauge designed primarily for use upon the water tank or tender of a railway locomotive.

Under present conditions it is not possible to determine the amount of water within the tank or tender of the locomotive without climbing to the top of the tank and inspecting the interior thereof from this precarious position. It is very often the case that an unnecessary number of stops are made during a trip, for the purpose of taking on water and while this delays the progress of the train and also adds considerably to the cost of operation it is the practice to make the stops rather than subject the fireman to the dangerous feat of climbing onto the tank while the locomotive is in motion and inspecting the contents. It has not been feasible to place on the tank an ordinary gauge glass such as commonly supported outside of boilers for indicating water levels, because it is contrary to regulations to have any parts projecting more than a slight predetermined distance beyond the tank. Such a gauge glass has also been objectionable because it is likely to be broken or torn off by objects brought violently into contact therewith.

It is an object of the present invention to provide a locomotive boiler or tender with a gauge which can be built thereinto, presents no projecting parts of an objectionable nature, has no portions liable to become accidentally broken, and provides a means whereby the engineer can easily determine, without leaving his position, the amount of water contained within the tank.

With the foregoing and other objects in view which will appear as the description proceeds the invention resides in the combination and arrangement of parts and in the details of construction herein described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
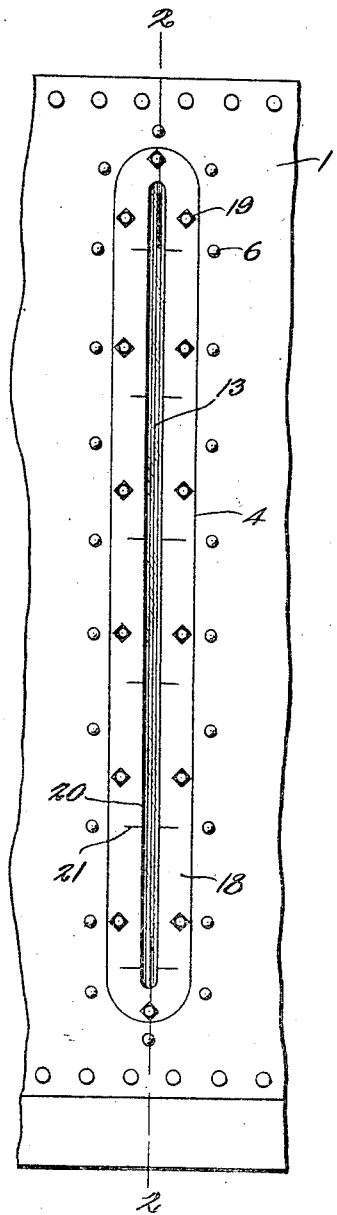
Figure 1 is an elevation of a portion of the wall of a tank or tender with which is assembled a gauge such as constitutes the present invention.
Figure 2:
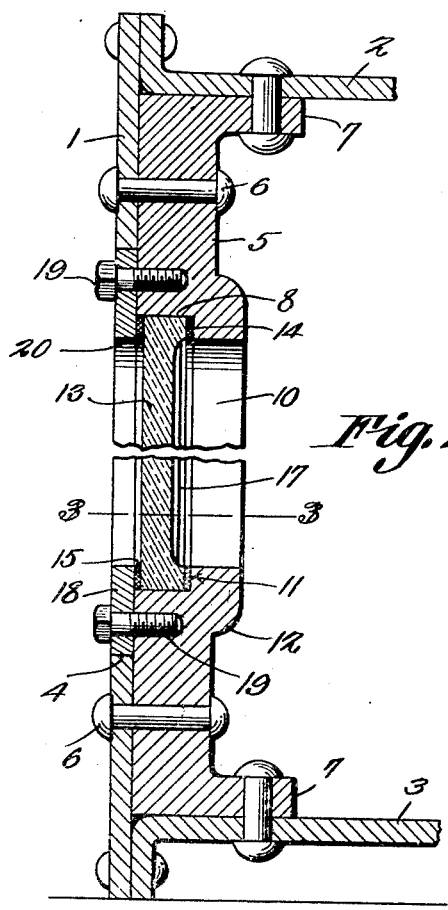
Figure 2 is an enlarged section on line 2—2, Figure 1, the middle portion of the structure being broken away.
Figure 3:
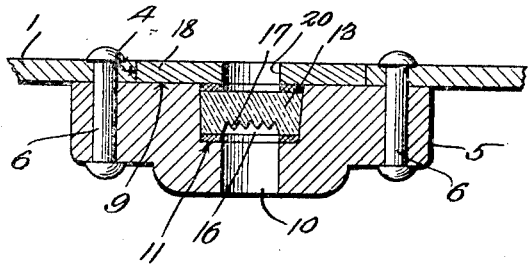
Figure 3 is a section on line 3—3 Figure 2.

Referring to the figures by characters of reference 1 designates a wall of a locomotive tank or tender, this being riveted in the usual manner to the top 2 and bottom 3 of the tank. The wall 1 is provided with a substantially vertical slot 4 extending to points close to the bottom and top of the tank. Fitted against this slotted wall is an elongated casting or the like constituting the body 5 of the gauge. This body is fitted snugly against the top and bottom of the tank as well as to the slotted wall and it is attached to said slotted wall by means of rivets 6. Ears or flanges 7 are extended from the ends of the body and are riveted or otherwise fastened to the top and bottom respectively of the tank.

Formed in that face of the body 5 nearest the slotted wall 1 is a recess 8 adapted to be exposed through the slot 4 and having its walls spaced from the walls of the slot so that portions of the body 5 will thus be exposed and form a continuous shoulder extending around recess 8 and up to the wall of the slot 4. This shoulder has been indicated at 9. A slot 10 is provided in the inner wall of the recess and extends longitudinally thereof, the length and width of this slot being such that the inner wall of recess 8 forms a narrow shoulder 11 extending around the slot. The body can be reinforced adjacent the slot by thickening it as shown at 12.

A glass plate 13 of suitable strength is fitted snugly within the recess 8, there being a packing 14 of asbestos or the like interposed between the marginal portion of this plate and the shoulder 11. The margin of the outer surface of the plate is also engaged by a continuous packing strip 15 likewise of asbestos or the like. The back or inner face of plate 13 is recessed longitudinally as shown at 16 and is formed with longitudinally extending prismatic ribs 17 producing an optic which is readily visible through the glass where exposed in the slot 4.

For the purpose of holding the glass firmly in place, there is provided a retaining plate 18 adapted to fit within the slot 4 and to be attached to the body 5 by screws 19 or the like. This plate has a longitudinal slot 20 through which the glass 13 is exposed. Suitable graduations 21 designating units of measure can be provided along the slot.

The gauge herein described is preferably placed in that wall of the tank or tender nearest the locomotive and at a point where it can be seen readily by the engineer. It is to be understood, however, that it can be situated at any other place desired. By using the prismatic glass the level of the water back of the glass can be seen at any time and thus it is unnecessary to climb onto the tender to examine the contents thereof. When the engineer approaches a water tank he can readily determine, by glancing at the gauge, whether it is necessary to stop or whether he has sufficient water to carry him to the next tank. Consequently a considerable saving of time and expense is effected in the operation of trains. It will be seen that the device has no objectionable projecting parts, that the glass is fully protected at all times, and that by simply removing plate 18 it is possible to obtain access to the glass for any purpose.

It might be stated that one objection to the use of ordinary water gauges utilizing glass tubes has been the tendency thereof to clog because of the sediment and other foreign matter mixed with the water in the tank. By providing a gauge such as herein described, it makes no difference how clear the water may be. The level of the water is always visible and the back or inner face of the glass is kept clean by the constant wash of the water thereagainst while the locomotive is in motion.

What is claimed is:

1. The combination with a tank having a substantially vertical slot in the wall thereof extending close to the bottom of the tank, of a gauge body secured within the tank and having an elongated recess smaller than the slot and extending longitudinally thereof, there being an elongated slot in the body extending longitudinally of the recess but smaller than the same, a glass plate seated in the recess and having a prismatic inner surface exposed through the slot in the wall, and means secured to the body for retaining said plate within the recess and accessible from outside the tank.

2. The combination with a tank having a substantially vertical slot in the wall thereof extending close to the bottom of the tank, of a gauge including a body secured in the tank and having an elongated recess exposed within the slot, there being an elongated slot in the inner wall of the recess, a glass plate mounted in the recess and having a prismatic inner surface, and means seated in the slot in the wall and secured to the body for retaining the glass in the recess.

3. The combination with a locomotive tender or water tank, of a water gauge housed within the tank and including a prismatic glass supported substantially vertically and extended close to the bottom of the tank, there being a slot within the wall of the tank through which the glass is exposed and means accessible outside of the tank for fastening the glass in position.

4. The combination with a locomotive tender or water tank, of a water gauge housed in the tank and secured to one wall thereof, said gauge including a recessed body, a glass seated in the recess, there being an elongated slot in the body back of the glass and a slot in the tank wall through which the glass is exposed, and means accessible outside of the tank for holding the glass in the recess.

In testimony that I claim the foregoing as my own, I have hereto affixed my signature.

ROBERT A. WYATT.